United States Patent
Kikkawa et al.

(10) Patent No.: US 7,734,098 B2
(45) Date of Patent: Jun. 8, 2010

(54) FACE DETECTING APPARATUS AND METHOD

(75) Inventors: Teruki Kikkawa, Tokyo (JP); Tomoyasu Yoshikawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1121 days.

(21) Appl. No.: 11/038,022

(22) Filed: Jan. 21, 2005

(65) Prior Publication Data

US 2005/0179780 A1 Aug. 18, 2005

(30) Foreign Application Priority Data

Jan. 27, 2004 (JP) .............................. 2004-018245

(51) Int. Cl.
*G06K 9/46* (2006.01)
*G06K 9/66* (2006.01)
*G03B 27/52* (2006.01)
*H04N 5/76* (2006.01)

(52) U.S. Cl. .................. 382/195; 382/192; 355/41; 348/231.3; 348/231.6; 348/231.99

(58) Field of Classification Search .............. 382/192, 382/195; 355/41; 348/231.3, 231.6, 231.99
See application file for complete search history.

(56) References Cited

U.S. PATENT DOCUMENTS

| | | | | |
|---|---|---|---|---|
| 5,128,711 A | * | 7/1992 | Terashita et al. ............. | 355/41 |
| 5,289,227 A | | 2/1994 | Kinjo | |
| 6,157,782 A | * | 12/2000 | Aoyama .................... | 396/104 |
| 6,538,751 B2 | | 3/2003 | Ono | |
| 6,697,502 B2 | * | 2/2004 | Luo ........................... | 382/115 |
| 6,741,082 B2 | | 5/2004 | Ono | |
| 6,813,395 B1 | * | 11/2004 | Kinjo ......................... | 382/305 |
| 6,895,181 B2 | * | 5/2005 | Nonaka et al. ............. | 396/125 |
| 7,038,715 B1 | * | 5/2006 | Flinchbaugh ............ | 348/207.99 |
| 2003/0169343 A1 | | 9/2003 | Kagaya et al. | |
| 2004/0100487 A1 | * | 5/2004 | Mori et al. ................ | 345/724 |
| 2004/0151376 A1 | * | 8/2004 | Nomura et al. ............ | 382/181 |
| 2004/0207743 A1 | * | 10/2004 | Nozaki et al. ............ | 348/333.12 |
| 2005/0264658 A1 | | 12/2005 | Ray et al. | |

FOREIGN PATENT DOCUMENTS

| | | |
|---|---|---|
| JP | 05-196857 | 8/1993 |
| JP | 8-331495 | 12/1996 |
| JP | 2000-354247 | 12/2000 |
| JP | 2000-358206 | 12/2000 |
| JP | 2001-195582 | 7/2001 |
| JP | 2001-211382 | 8/2001 |
| JP | 2001-309225 | 11/2001 |

(Continued)

*Primary Examiner*—Vu Le
*Assistant Examiner*—Soo Jin Park
(74) *Attorney, Agent, or Firm*—Fitzpatrick, Cella, Harper & Scinto

(57) ABSTRACT

A process time is shortened while a face detection precision is maintained high. A face detection unit for extracting a face area of a photographic subject from an image taken with a digital camera or the like includes a unit for acquiring focussing area information in an image area from image data and accessory information of image data regarding photographic conditions and the like, a unit for determining a face detection area in the image area in accordance with the focussing area information, and a unit for executing a face detection process not for a whole image area but partially for a face.

3 Claims, 9 Drawing Sheets

FOREIGN PATENT DOCUMENTS

| | | | |
|---|---|---|---|
| JP | 2001-330882 | | 11/2001 |
| JP | 2001330882 A | * | 11/2001 |
| JP | 2003143444 A | * | 5/2003 |
| JP | 2003-163827 | | 6/2003 |
| JP | 2003163827 A | * | 6/2003 |
| JP | 2003-259296 | | 9/2003 |

* cited by examiner

FACE DETECTING APPARATUS AND METHOD

BACKGROUND OF THE INVENTION

1. Field of the Invention

The present invention relates to a means for extracting a photographic subject from still image data, and more particularly to a face detecting apparatus and method.

2. Related Background Art

Digital still cameras and digital video cameras are prevailing rapidly nowadays. Along with this, there are increasing demands for tools such as a tool for processing images photographed with these photographing apparatuses to provide a high image quality.

In the high image quality process, for example, a face detection process is executed for an image, and if there is a human face, a correction amount is determined basing upon the detected face. This method is widely known.

Most of the process time required for the high image quality process is occupied by the face detection process time. This process time has been long desired to be shortened.

Several means for improving a face detection efficiency have been proposed.

For example, Japanese Patent Application Laid-Open No. 2003-163827 (no corresponding U.S. application) proposes an approach by which a photographing apparatus executes a pixel thinning process for a whole image in accordance with a photographing mode and a photographic subject magnification factor, and changes the number of divided blocks to be subjected to the face detection process. With this approach, a face detection precision is changed for each photographed image to improve the process efficiency.

According to the invention described in Japanese Patent Application Laid-Open No. 2003-163827, the face detection process is executed for the whole area of an image. There arises therefore the problem that an area subjected to the face detection process increases greatly as the image data amount increases, and the process time prolongs. Another problem resides in that the detection precision is degraded if the number of thinned pixels is increased in order to shorten the process time.

SUMMARY OF THE INVENTION

The present invention has been made in consideration of the above-described problems and aims to shorten the process time by executing the face detection process more efficiently, while the detection precision is maintained high. Especially, the present invention aims to executing the face detection process efficiently in the case of a portrait photographing with a plurality of faces.

In order to achieve the above object, a face detecting apparatus of the present invention for extracting a face area of a photographic subject from an image on the basis of image data and accessory information associated with the image data comprises: means for determining a plurality of face detection area in an image area of the image in accordance with the accessory information; and means for executing a face detection process in the determined face detection area according to a prescribed priority of order.

According to the present invention, since a face detection area is determined by using accessory information such as photographic conditions, a process time required to detect a face can be shortened. Furthermore, in a system for processing an image in accordance with a face detection result, the process time of the whole system can be shortened because of a shortened face detection process time.

DETAILED DESCRIPTION OF THE PREFERRED EMBODIMENTS

Preferred embodiments of the present invention will be described in detail with reference to the accompanying drawings.

First Embodiment

Figure 1:
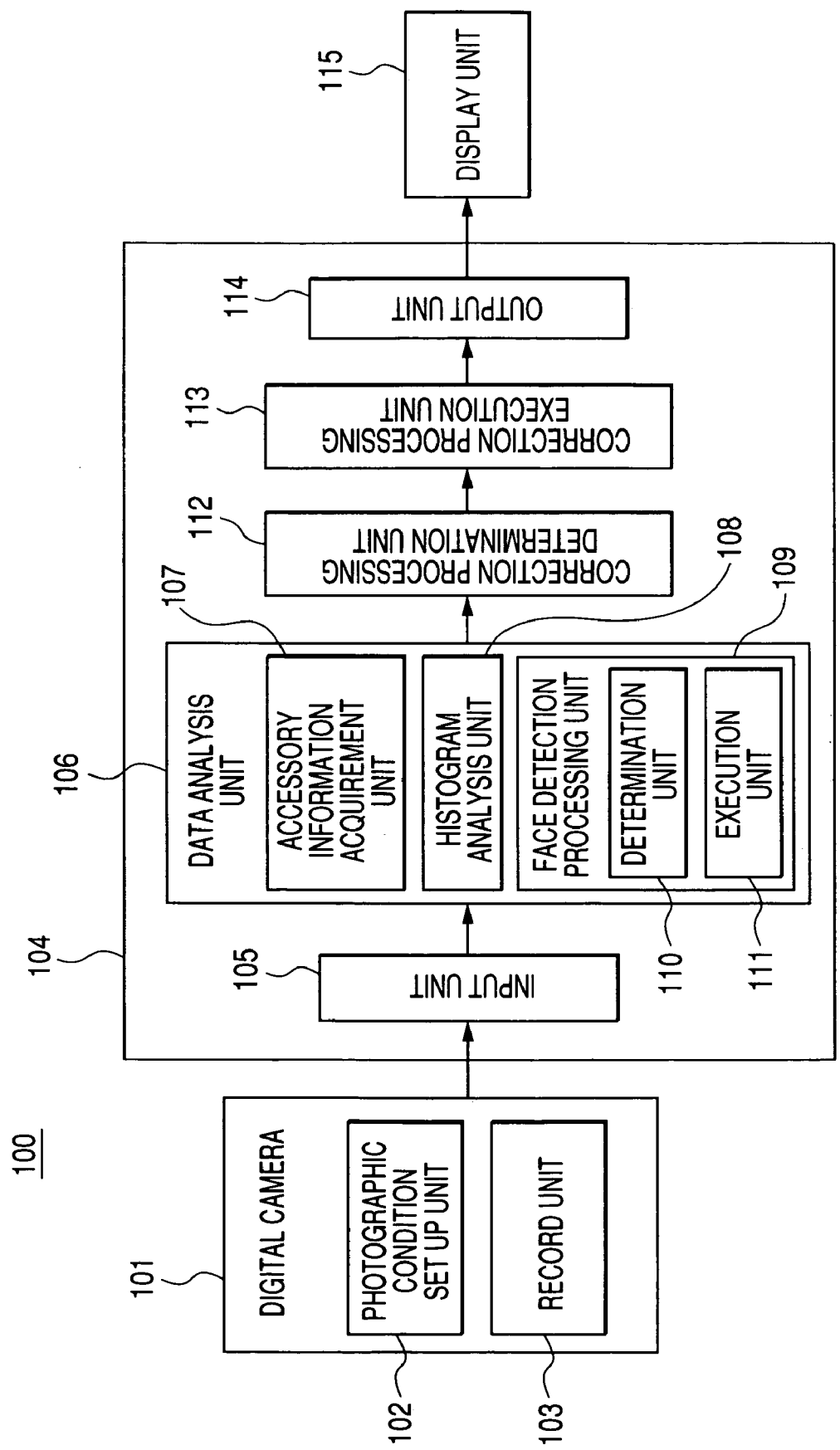
FIG. 1 is a block diagram showing the structure of an image processing system adopting face detecting means of the present invention.

A face detecting means of the present invention is applied to an image processing system such as shown in FIG. 1.

The image processing system 100 shown in FIG. 1 is constituted of a digital still camera 101 (hereinafter written as DSC), a image processing apparatus 104 and a display unit 115.

DSC 101 is constituted of a photographic condition setup unit 102 for setting photographic conditions and a record unit 103 for recording photographed image data during photographing.

The photographic condition setup unit 102 sets various photographic conditions necessary for photographing. A user can set various conditions such as a photographic scene, a white balance mode, and a flash on/off, by operating buttons on DSC 101.

The record unit 103 generates image data including photographed image data and accessory information of photographic conditions, and records it.

A recording medium may be a memory built in DSC 101 or a detachable external medium.

Figure 2:
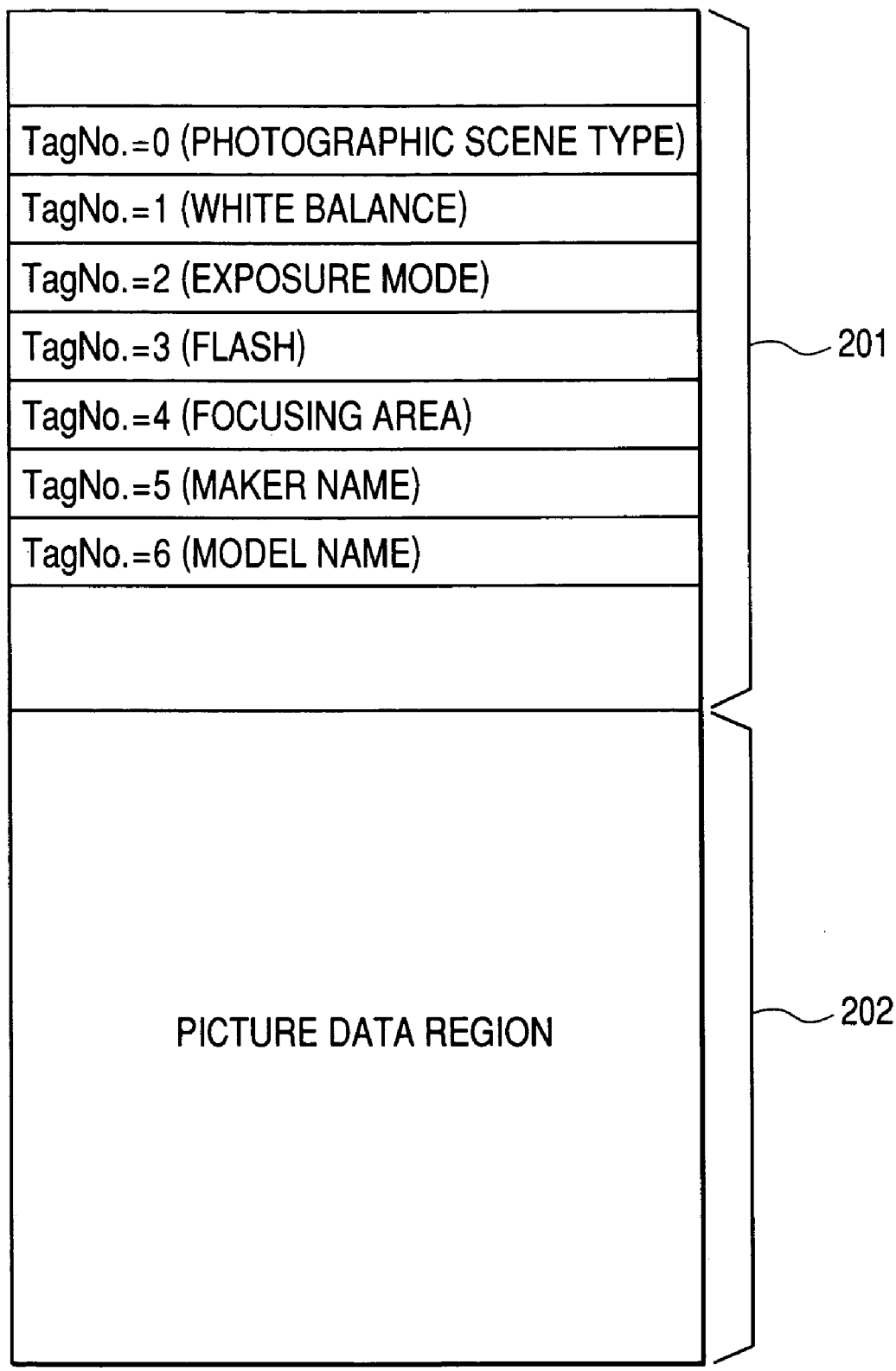
FIG. 2 is a diagram illustrating an image (picture) file format of a digital still camera (DSC).

An image file format to be used for recording image data is in conformity with, for example, Exchangeable Image File Format (Exif). As shown in FIG. 2, the image file format is constituted of a tag region 201 in which the accessory information, i.e., photographic condition data, is recorded and an image (picture) data region 202 in which photographed image data is stored.

The photographic condition data is recorded in the tag region 201 at positions starting from a predetermined offset position from the top, and contains, for example, the contents of TagNo.=0 to 6.

TagNo.=0 is information of a photographic scene type. For a "landscape mode" of DSC, a value representative of the "landscape mode" is stored in TagNo.=0. The photographic scene type is not limited only to this, but a "standard", "portrait", "night scenery" or the like may be designated.

TagNo.=1 is information of white balance. For an "automatic white balance" of DSC, a value representative of automatic white balance setup is stored in TagNo.=1. For manual white balance setup, a value representative of manual setup is stored.

TagNo.=2 is information of an exposure mode. For "automatic exposure" of DSC, a value representative of automatically controlled parameter exposure setup is stored in TagNo.=2. For "manual exposure" or "automatic bracket" setup, a corresponding value is stored.

TagNo.=3 is information of a flash. For "flash emission" of DSC, a value representative of flash emission is stored in TagNo.=3. A value representative of detailed information such as "automatic emission mode" and "red-eye reduction mode" of the flash emission may also be stored.

TagNo.=4 is information of a focusing area. Stored in TagNo.=4 are values representative of "range finding frame number", "used range finding frame" and "photographic subject distance in each range finding frame" respectively used for focusing control of DSC.

Detailed description of focusing control for photographing is omitted because this does not constitute the main characteristics of the present invention. With this focusing control, for example, a blur amount of a photographed image in a predetermined focusing evaluation area is calculated and the lens position is controlled so that the blur amount becomes minimum. This focusing control is described, for example, in Japanese Patent Application Laid-Open No. 2003-163827.

Figure 3:
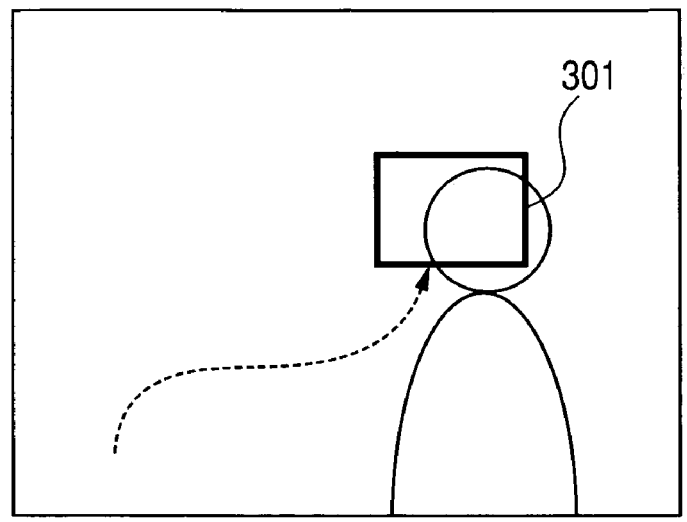
FIG. 3 is a diagram illustrating that a user of DSC moves a focusing evaluation area.

A focusing control method such as shown in FIG. 3 is also known by which a user moves a focusing evaluation position 301 to a desired position and determines the focusing evaluation area in accordance with the focusing evaluation position.

A person or an object like a person is often selected as the main photographic subject in order to determine the focusing evaluation area. When a user determines the focusing evaluation area, there is the tendency that the user determines the focusing evaluation area so as to focus on a person.

Figure 4:
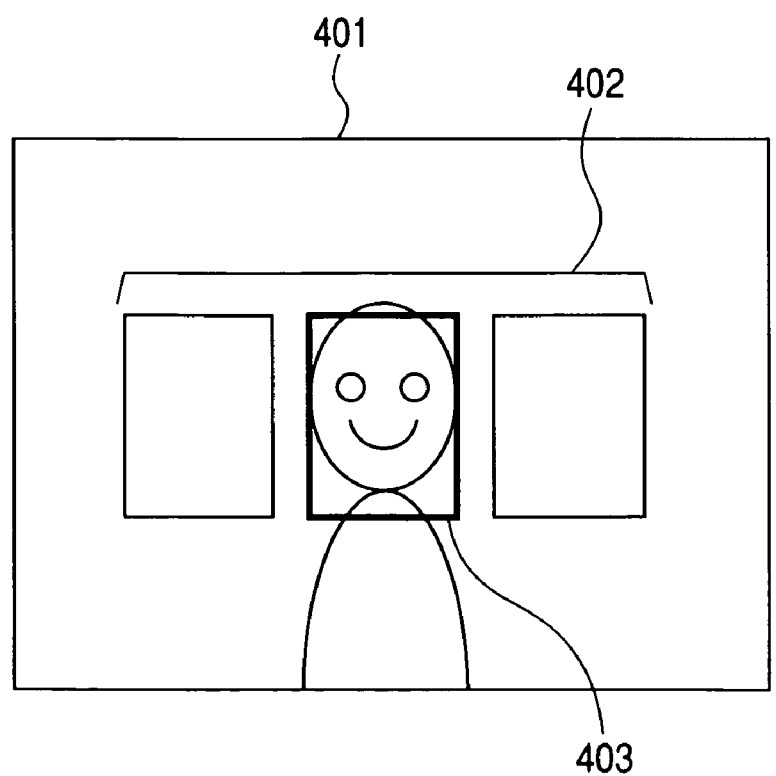
FIG. 4 is a diagram showing an example of a display screen of a liquid crystal monitor mounted on the back of DSC.

FIG. 4 shows an example of a display screen of a liquid crystal monitor 401 mounted on the back of DSC. DSC prepares beforehand a range finding frame 402, and an emphasized range finding frame 403 is actually used for focusing control.

TagNo.=5 is information of a maker name, and character string information representative of the maker name is stored therein. TagNo.=6 is information of a model name of DSC, and character string information representative of the model name is stored therein.

Reverting to FIG. 1, the image processing apparatus 104 is made of, for example, a personal computer, activates predetermined application software, acquires image data from DSC 101, corrects it and outputs it. To this end, the image processing apparatus 101 is constituted of an input unit 105, a data analysis unit 106, a correction processing determination unit 112, a correction processing execution unit 113 and an output unit 114. The functions of the respective units 105 to 114 are realized by activating the application.

The input unit 105 automatically recognizes a connection of DSC 101 to the image processing apparatus 104, and starts reading image data. Another configuration may be used in which image data is read after a user instruction is acknowledged.

The data analysis unit 106 is constituted of an accessory information acquirement unit 107 for acquiring accessory information affixed to image data, a histogram analysis unit 108 for analyzing the feature of an image by generating a histogram from image data, and a face detection processing unit 109 which is the main characteristics of the present invention.

The accessory information acquirement unit 107 acquires photographic condition data during photographing, such as a photographic scene type, a white balance, an exposure mode, a flash and a focusing area. The histogram analysis unit 108 generates a histogram of image data and calculates statistically a feature amount of an image. The feature amount is, for example, an average luminance, a luminance dispersion, and an average chroma, respectively of an image.

The face detection processing unit 109 is constituted of a determination unit 110 for determining an area for which a face detection process is executed, and an execution unit 111 for executing the face detection process in accordance with a result obtained by the determination unit.

The determination unit 110 determines the face detection area in an image area in accordance with focusing area information contained in the accessory information, in order to allow the execution unit 111 to be described later to execute. The detailed description will be given later.

The execution unit 111 executes the face detection process for the setup area. Various methods for the face detection process have been proposed. For example, a face is detected by detecting one eye, generating a candidate of both eyes from the one eye and recognizing a face pattern.

The correction processing determination unit 112 determines an image correction algorithm in accordance with an analysis result obtained by the data analysis unit 106. For example, the correction processing contents and correction procedure are acquired from the accessory information acquirement unit 107 and face detection processing unit 109, and the feature of the luminance distribution of an image is acquired from the histogram analysis unit 108, to thereby calculate correction parameters suitable for each of the correction processing contents. The correction processing contents include a gradation correction process, a contrast correction process, a color balance process, a chroma correction process, a contour emphasis process and the like.

The correction processing execution unit 113 executes an image correction process for image data, in accordance with the image correction algorithm determined by the correction processing determination unit 112.

The output unit 114 converts image data subjected to the correction process by the correction processing execution unit 113 into data capable of being displayed on the display unit, and outputs it to the display unit 115.

The display unit 115 outputs and displays the image input from the output unit 114 in a desired form. Next, with reference to the flow chart of FIG. 5, description will be made on the operation of the image processing apparatus 104 of this embodiment.

At Step 501, when DSC 101 is connected, the image processing apparatus 104 starts reading image (picture) data.

At Step 502, a histogram is generated for the image data read at Step 501 to calculate a feature amount. The feature amount is an average luminance, a luminance dispersion and the like describe earlier.

At Step 503, the accessory information representative of the photographic conditions is extracted from the image data read at Step 501.

The accessory information may be written by using an application or the like after photographing.

At Step 504, a face detection area is set in accordance with the focusing area information in the accessory information acquired at Step 503. If the flow returns to Step 504 because a face cannot be detected at Steps 505 and 506 to be described later, then a face detection area different from the already set face detection area is set again. For example, the first face detection area is set within the focusing area and the second face detection area is set in the area different from the focusing area to start a face detection process from the upper left of the image.

At Step 505, the face detection process is executed for the face detection area set at Step 504. However, if it is judged that a person "exists", i.e., the face was detected, this Step is terminated to advance to Step 506.

At Step 506, the flow advances to Step 507 if it is judged at Step 505 that a person "exists" or the face detection process is completed for the whole image. In contrast, the flow returns to Step 504 to set again the face detection area, if it is judged that a person "does not exist" or the face detection process is not completed for the whole image.

At Step 507, the correction process contents are selected in accordance with the accessory information during photographing and the face detection result acquired at Steps 503 to 506, and the correction processing amount is determined in accordance with the image feature amounts acquired at Step 502. In selecting the correction processing contents, the gradation correction process, contrast correction process, color balance process, chroma correction process, contour emphasis process or the like is selected in accordance with a combination of the photographic scene type, white balance, exposure mode, flash and the like respectively contained in the accessory information.

The image processing apparatus 104 of the embodiment determines the correction processing contents by recognizing image data as a photographic scene type "person", if Step 505 judges that a person "exists" and the photographic scene type is "standard". This is because the correction process suitable for the photographic subject is to be used.

Another configuration may be adopted by which the correction process for person is always used if the face detection results judge that a person "exists", irrespective of the contents of the photographic scene type.

After the correction processing contents are determined, a correction target value is determined from the accessory information and image feature amounts, to calculate the parameters to be used when the correction is executed.

The correction target value is determined beforehand for each of the processing contents to be determined by a combination of accessory information, and preferably stored as a table in the image processing apparatus. Alternatively, the correction target value may be calculated from the feature amounts by using an equation.

Figure 6:
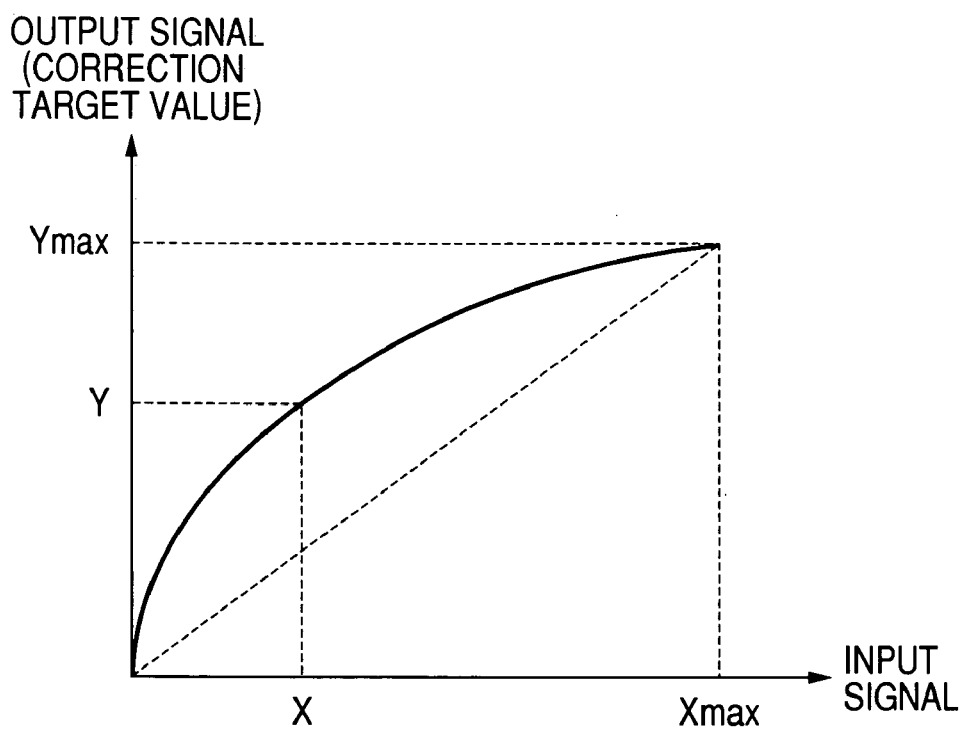
FIG. 6 is a diagram explaining calculation of a gamma value to be used for correction processing.

The parameters to be used when the correction is executed are calculated from the correction target value. For example, the gamma value for gradation correction can be calculated from the following equation (1). This equation can be derived by referring to FIG. 6:

$$\gamma = (\log Y_{max} - \log Y)/(\log X_{max} - \log X) \quad (1)$$

wherein $X_{max}$ is a maximum value of an input signal, $Y_{max}$ is a maximum value of an output signal, X is an appropriate intermediate level of an input signal and Y is an appropriate intermediate level of an output signal.

At Step 508, the image correction process is executed in accordance with the correction processing contents and parameters determined at Step 508.

Figure 7:
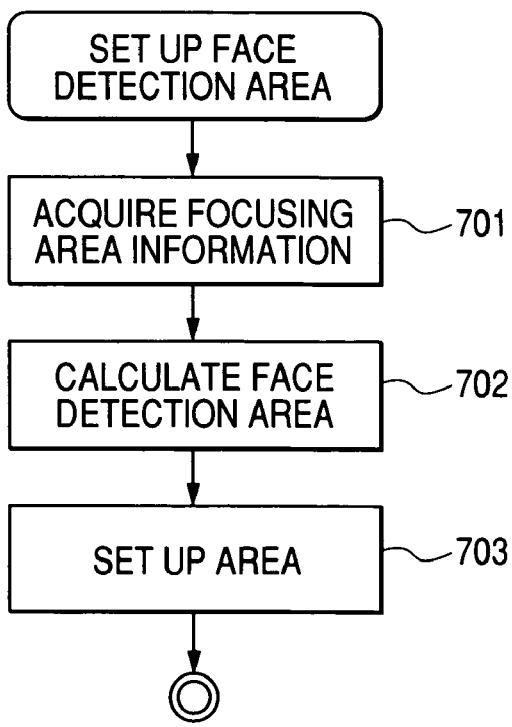
FIG. 7 is a flow chart illustrating the detailed operation of setting a face detection area.

Next, with reference to the flow chart of FIG. 7, description will be made on a method of determining a face detection area in accordance with the focusing area information, as an example of the face detection area setup process at Step 504.

Figure 5:
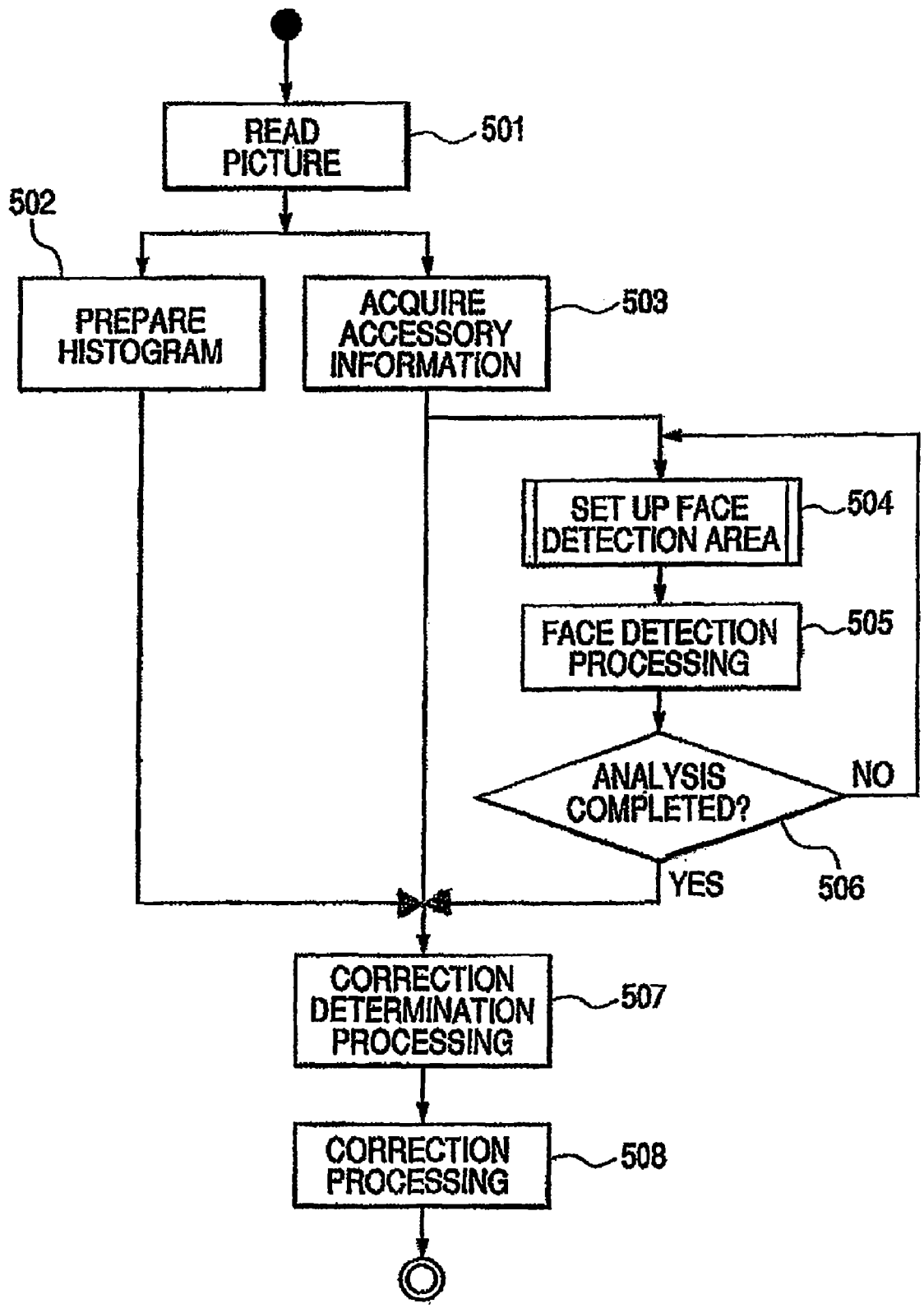
FIG. 5 is a flow chart illustrating the operation of an image processing apparatus.

At Step 701, the focusing area information is extracted from the accessory information acquired at Step 503 (refer to FIG. 5). In this embodiment, the focusing area information is "range finding frame number" and "used range finding frame".

At Step 702, range finding frame positions are obtained from the acquired "range finding frame number", and a face detection area to be actually used for focusing control is determined from the "used range finding frame" to calculate coordinate values.

Figure 8:
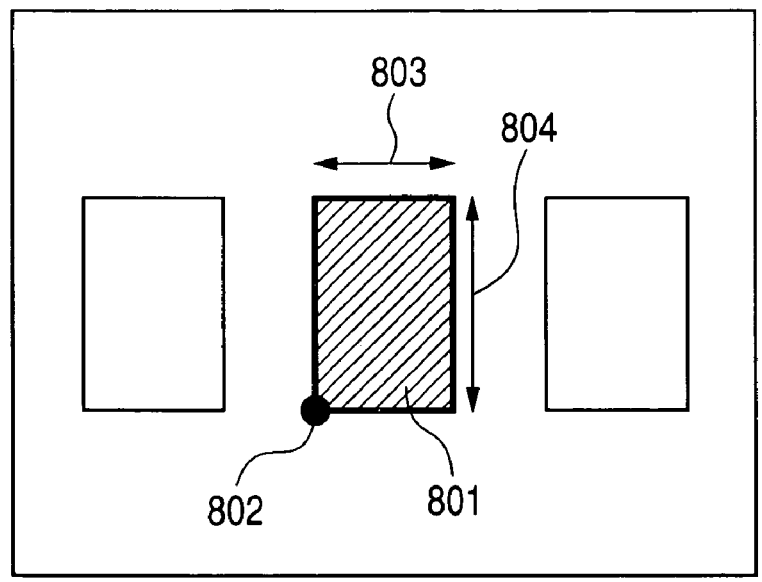
FIG. 8 is a diagram showing the relation between a range finding frame and image data.

For example, as shown in FIG. 8 three range finding frame positions are obtained from a "range finding frame number=3", and a face detection area in an emphasized frame 801 is determined from a "used range finding frame=center" as prior to other frame.

These three range finding positions can be obtained from the maker name and model name in the tag region 201, and it is preferable to store the range finding position information in the image processing apparatus for each pair of maker name and model name of DSC.

Figure 9:
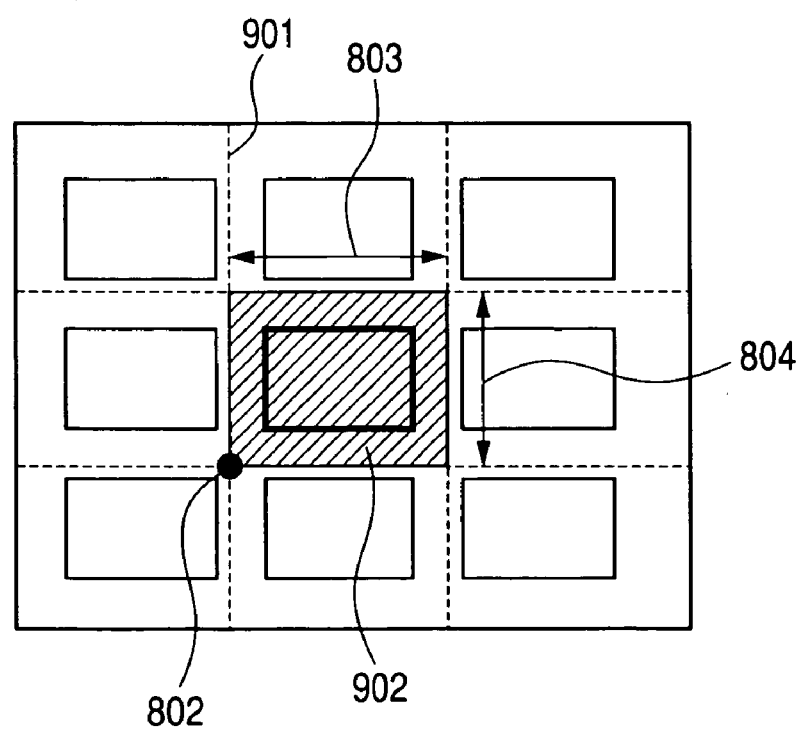
FIG. 9 is a diagram illustrating an operation of dividing an image in accordance with the number of range finding frames and determining a face detection area by using a range finding position.

Alternatively, the face detection area with a priority of order may be determined from the "used range finding frame" by roughly calculating the range finding positions by dividing image data in accordance with the "range finding frame number". For example, as shown in FIG. 9 under the conditions of "range finding frame number=9" and "used range finding frame=center", the image data area is divided in accordance with the range finding frame number (broken lines 901) and the face detection area (hatched area) 902 can be determined from the "used range finding frame" as an area with a priority of order. As to other range finding frames, for example, the range finding frame adjacent to the used range finding frame is selected as the face detection area with subsequent priority of order.

Figure 10:
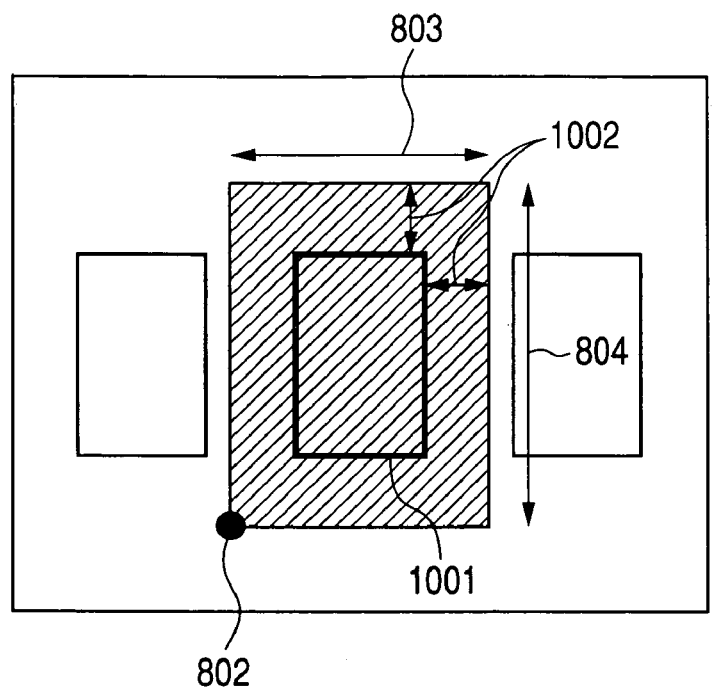
FIG. 10 is a diagram illustrating an operation of determining a face detection area by adding an offset value to a range finding frame.

Furthermore, as shown in FIG. 10, in order to obtain a face detection area having a size predetermined by the image processing apparatus 104, the size may be changed by adding or subtracting offset values 1002 to or from a range finding frame size 1001 at up, down, right and left.

It is possible to flexibly deal with an image size during photographing, by determining a ratio of the face detection area to a resolution of photographed image data.

A face detection start position 802, a lateral width 803 and a height 804 are calculated for the position of the face detection area determined by the above-described process.

At Step 703, it is set so that the face detection-area calculated at Step 702 can be subjected to the face detection process.

According to the embodiment, face detection can be performed efficiently by determining the face detection area in accordance with the focusing area information, by utilizing focusing control during photographing with DSC relative to a photographic subject having a high possibility of person.

Efficient face detection can shorten the process time of the whole image correction process.

Namely, according to this embodiment, face detection is performed by means for acquiring focusing area information in an image area by using image data and accessory information of the image data, means for determining a face detection area in the image area in accordance with the focusing area information, and means for executing a face detection process.

Second Embodiment

The second embodiment pertains to a method of setting a face detection area as described in the first embodiment, for the case that the focusing area information has a plurality of "used range finding frames".

The system configuration of the second embodiment is shown in FIG. 1 same as that of the first embodiment.

In the second embodiment, the determination unit 110 of the face detection processing unit 109 shown in FIG. 1 determines a face detection area in accordance with the "range finding frame number" and "used range finding frames" of the first embodiment and in addition "photographic subject distance in each range finding frame". It is therefore possible to deal with the case that there are a plurality of "used range finding frames".

With reference again to FIG. 7, description will be made on the face detection area setting method as the main characteristics of the second embodiment. In the second embodiment, at Step 701 information of the focusing area is acquired from the accessory information acquired at Step 503 shown in FIG. 5. The information of the focusing area includes "range finding frame number", "used range finding frames" and "photographic subject distance in each range finding frame".

At Step 702, range finding frame positions are obtained from the "range finding frame number" of the acquired focusing area information. Areas to be actually used for focusing control are determined as face detection candidate areas, in accordance with the "used range finding frames". According to the characteristics of the second embodiment, the face detection candidate areas are given a priority order in accordance with the "photographic subject distance in each range finding frame".

Figure 11:
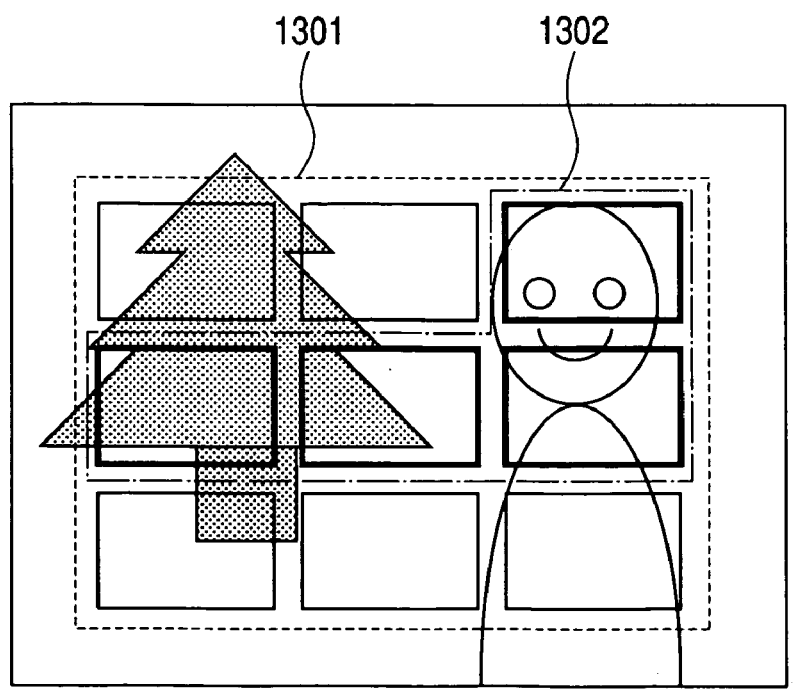
FIG. 11 is a diagram showing the relation between a range finding frame and image data in a system according to a second embodiment.

For example, as shown in FIG. 11, a range finding frame position 1301 is obtained from "range finding frame number=9", and areas 1302 having an emphasized frame by "used range finding frames=left, center, right, upper right" are used as the face detection candidate areas. If the "photographic subject distance in each range finding frame" among the used range finding frames is "upper right<right<left<center", the priority order of the face detection candidate areas is determined from the photographic subject distances.

Namely, in this example, the upper right frame position having the shortest photographic subject distance is first designated as the face detection area. Thereafter, the flow advances to next Step. If the analysis completion (judgement that a person "exists" or analysis completion of the whole image) is not achieved at Step 506, then the face detection area at the "right" range finding frame position is used to advance to next Step. If the analysis completion is not achieved again at Step 506, a similar process is executed in the order of "left" and "center".

At Step 703, the face detection area information calculated at Step 702 is set so that it can be used in the face detection process.

As described above, according to the second embodiment, face detection can be performed efficiently by determining the face detection area in accordance with the focusing area information, by utilizing the fact that there are a high possibility of focusing control during photographing with DSC relative to a photographic subject person and a high possibility that a person is at a position nearer than that of a landscape.

Namely, according to the second embodiment, face detection is performed by means for acquiring focusing area information of an image by using image data and accessory information of the image data, means for acquiring photographic subject distance information from the focusing area information, means for determining a priority order of the focusing area information, and means for determining a face detection area in accordance with the priority order and executing a face detection process.

Third Embodiment

The third embodiment pertains to a method of setting a face detection area in accordance with photographic condition data other than the focusing area information.

The system configuration of the third embodiment is shown in FIG. 1 same as that of the first embodiment.

According to the configuration of the third embodiment, the photographic condition setup unit 102 of DSC 101 can set a photographic scene type as in the first embodiment and further set a detailed assistance mode.

Figure 12:
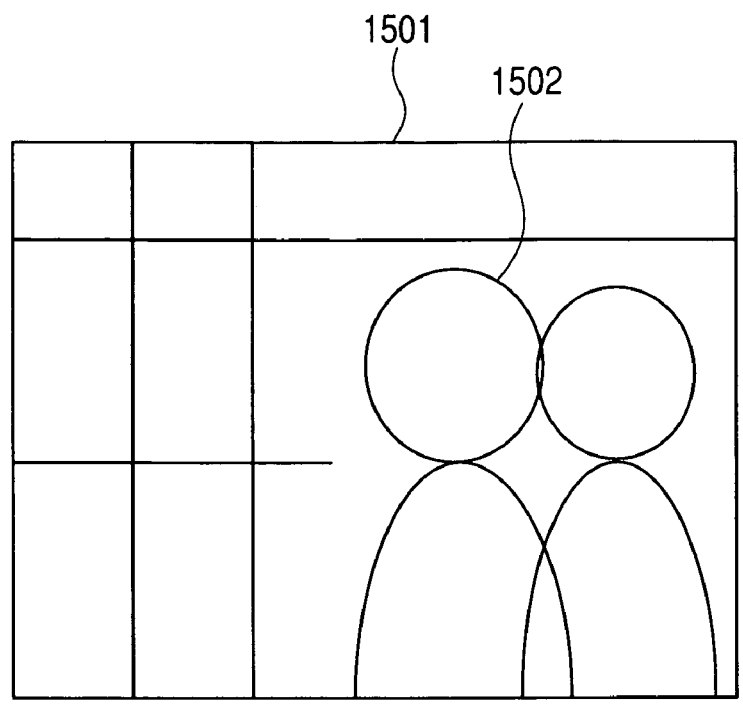
FIG. 12 is a diagram showing a guide display displayed in an assistance mode on a liquid crystal monitor mounted on the back of DSC in a system according to a third embodiment.

FIG. 12 shows an example of a display screen of the liquid crystal monitor 1501 mounted on the back of DSC 101. A photographer takes an image by using a guide display 1502 displayed on the liquid crystal monitor 1501.

In the guide display 1502 of the third embodiment, auxiliary lines are displayed in order to confirm horizontal positions when persons in the right screen and a building or the like in a left background are to be photographed.

Figure 13:
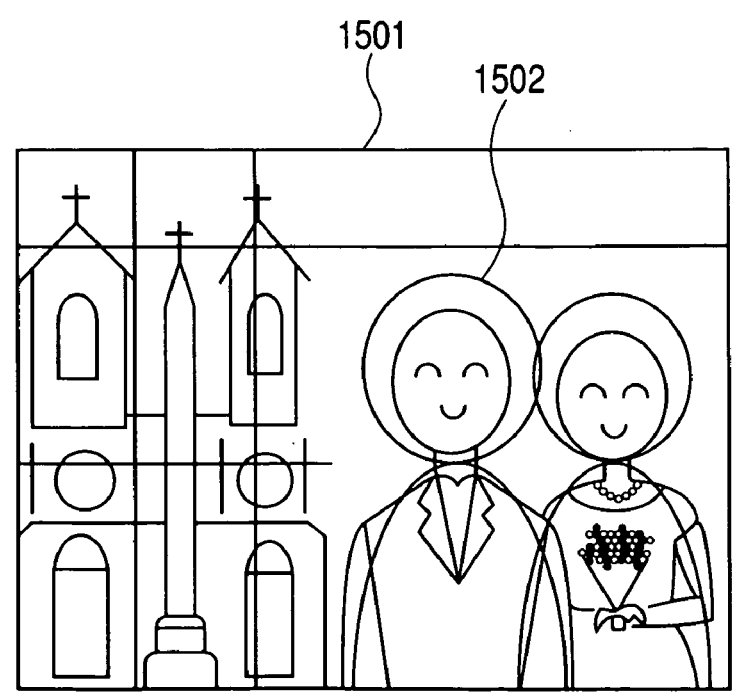
FIG. 13 is a diagram showing an example of a display screen of the liquid crystal monitor in the assistance mode.

FIG. 13 shows an image actually photographed. It can be seen that a user photographs by using the guide display 1502.

Photographed image data is recorded in the format same as that of the first embodiment, and assistance mode information is recorded in the tag region 201 (refer to FIG. 2). The assistance mode information includes information of using the assistance mode and the type of the assistance mode.

For example, in the assistance mode shown in FIGS. 12 and 13, a character string "left background" is recorded.

In the image processing apparatus 104 of the third embodiment, the data analysis unit 106 has an accessory information acquirement unit 107 and a face detection processing unit 109 respectively different from those of the first embodiment. The accessory information acquirement unit 107 acquires the assistance mode information, instead of the focusing area information acquired by the first embodiment.

The face detection processing unit 109 has a determination unit 110 different from that of the first embodiment. The determination unit 110 determines a face detection area in an image area in accordance with the assistance mode information contained in the accessory information.

Next, with reference to the flow chart of FIG. 5, description will be made on the characteristic points of the operation of the image processing apparatus 104 of the third embodiment. At Step 503, the accessory information affixed during or after photographing is acquired from the image data read at Step 501. In this case, the assistance mode information is acquired, instead of the focusing area information acquired in the first and second embodiments.

At Step 504, a face detection area is set in accordance with the assistance mode information in the accessory information acquired at Step 503. If the flow returns again to Step 504 because face detection was impossible at Steps 505 and 506, then a face detection area different from the already set face detection area is set again.

Other Steps are similar to those of the first embodiment, and the description thereof is omitted.

Figure 14:
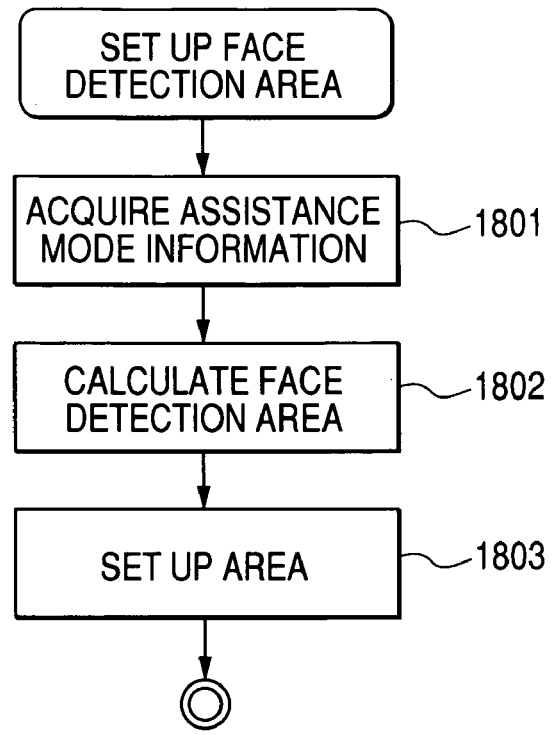
FIG. 14 is a flow chart illustrating an operation of setting a face detection area in a system according to a fourth embodiment.

Next, with reference to the flow chart of FIG. 14, description will be made on a method of setting a face detection area at Step 504 which is the characteristics of the third embodiment.

At Step 1801, information of the assistance mode is acquired from the accessory information acquired at Step 503 (refer to FIG. 5).

At Step 1802, an area having a high possibility that the face of a person exists is determined as a face detection area, in accordance with the acquired assistance mode information. Thereafter, the coordinate values are calculated.

Figure 15:
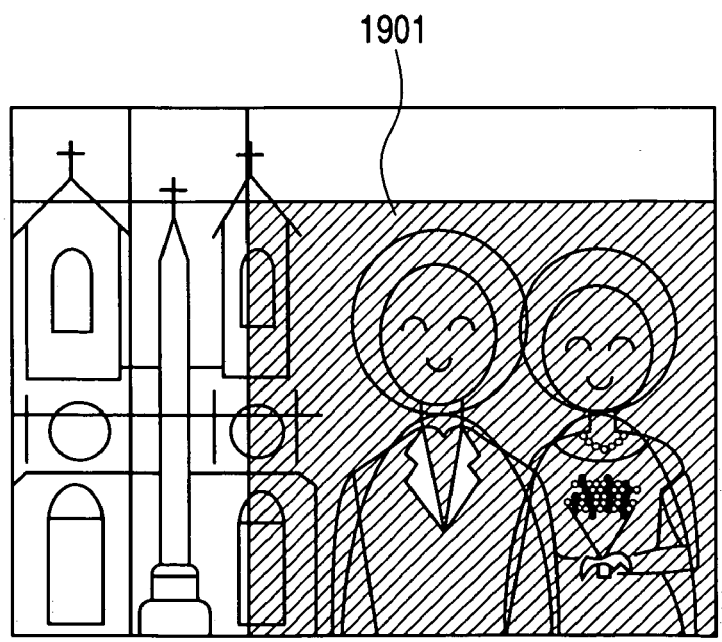
FIG. 15 is a diagram showing a face detection area in the system of the fourth embodiment.

For example, as shown in FIG. 15, a face detection area (hatched area) 1901 is determined from "assistance mode=left background".

The face detection area can be calculated from the maker name and model name stored in the tag region (refer to FIG. 2). It is preferable to store the assistance mode information of each maker of DSC and the face detection area corresponding to each assistance mode, in the image processing apparatus.

In the third embodiment, although a rough position (hatched area) 1901 is determined as the face detection area, the face area of a person in the assistance display may be set more strictly as a first face detection area.

At Step 1803, the face detection area information calculated at Step 1802 is set so that it can be used in the face detection process.

As described above, according to the third embodiment, face detection can be performed efficiently by determining the face detection area in accordance with the position information of a person in the guide display, by utilizing the fact that there is a high possibility that the face of a person is photographed based on the guide display in the assistance mode. Namely, according to the third embodiment, face detection is performed by means for acquiring assistance mode information during photographing from image data and accessory information of the image data and means for determining a face detection area in accordance with the assistance mode information and executing a face detection process.

Fourth Embodiment

The fourth embodiment pertains to the case in which the information of a focusing area as in the first embodiment is represented by "coordinate values".

The system configuration of the fourth embodiment is shown in FIG. 1 same as that of the first embodiment. In the fourth embodiment, DSC 101 uses the "coordinate values" to represent the information of a focusing area which information is one of the photographic conditions.

Namely, coordinate values (X, Y) are stored in TagNo.=4 (FIG. 2) of the accessory information as in the first embodiment, the coordinate values corresponding to the center of the area to be used for focusing control.

As different from the first embodiment, the determination unit 110 of the face detection processing unit 109 in the data analysis unit 106 of the fourth embodiment determines a face detection area in accordance with the "coordinate values".

In the following, description will be made on a method of setting a face detection area according to the fourth embodiment.

The image processing apparatus acquires the coordinate values of an area to be used for focusing control from the accessory information stored by DSC 101.

Next, a square area is calculated having its center represented by the acquired coordinate values, and used as a face detection area.

The square area is calculated so that it has the size predetermined by the image processing apparatus. Since the size is determined in proportion to a ratio of a photographed image to a resolution. It is therefore possible to flexibly deal with the image size during photographing.

In place of the square area, it is possible to use a circle having a radius R about the acquired coordinate values, or a rectangle area such as the areas 801, 902 and 1001 shown in FIGS. 8 to 10.

With the above-described process, a face detection are is set and a face detection process is executed.

As described above, according to the fourth embodiment, the face detection process can be executed efficiently by determining a face detection area from the coordinate values, in the accessory information, of an area to be used for focusing control.

The main aspects of the present invention are not limited only to detecting a face area. For example, the present invention is also applicable to detecting a characteristic area of an image of a photographic subject such as a specific object, animal or the like instead of the face of a person. By determining a characteristic detection area of an image in accordance with the accessory information of image data, it is possible to detect the characteristic area of an image in a short time and at high precision.

This application claims priority from Japanese Patent Application No. 2004-018245 filed on Jan. 27, 2004, which is hereby incorporated by reference herein.

What is claimed is:

1. A face detecting apparatus for extracting a face area of a photographic subject from a photographed image that was photographed by a camera, the apparatus comprising:

a unit that acquires (i) the photographed image which was photographed by a camera, (ii) focused area information, (iii) photographic subject distance information of each focused area, and (iv) information regarding a number of range finding frames used to control focusing, wherein each item of information was associated with the photographed image when the image was photographed by the camera;

a unit that (i) divides the photographed image into a plurality of division areas on the basis of the acquired information regarding the number of range finding frames, and (ii) determines as a face detection candidate area a division area including a focused area in the photographed image, on the basis of the acquired focused area information; and a unit that executes a face detection process that detects a human face inside the determined face detection candidate area, wherein if said dividing and determining unit determines as a plurality of face detection candidate areas a plurality of division areas respectively including a focused area, said executing unit sequentially executes the face detection process for the plurality of determined face detection candidate areas, starting with a face detection candidate area having a shortest photographic subject distance out of the plurality of face detection candidate areas, according to the acquired photographic subject distance information, and proceeding in order of increasing photographic subject distance, and wherein if a human face is detected, said executing unit terminates the face detection process.

2. An image processing system comprising:

an image processing apparatus including the face detecting apparatus as recited in claim 1, a digital still camera which input to the image processing apparatus the photographed image, the focused area information, photographic subject distance information of each focused area, and the information regarding the number of range finding frames used to control focusing, wherein each item of information was associated with the photographed image, and a display unit for displaying the photographed image.

3. A face detecting method for extracting a face area of a photographic subject from a photographed image that was photographed by a camera, the method comprising the steps of:

acquiring (i) the photographed image which was photographed by a camera, (ii) focused area information, (iii) photographic subject distance information of each focused area, and (iv) information regarding a number of range finding frames used to control focusing, wherein each item of information was associated with the photographed image when the image was photographed by the camera;

dividing the photographed image into a plurality of division areas on the basis of the acquired information regarding the number of range finding frames, and determining as a face detection candidate area a division area including a focused area in the photographed image, on the basis of the acquired focused area information; and executing a face detection process that detects a human face inside the determined face detection candidate area, wherein if said dividing and determining step determines as a plurality of face detection candidate areas a plurality of division areas respectively including a focused area, said executing step sequentially executes the face detection process for the plurality of determined face detection candidate areas, starting with a face detection candidate area having a shortest photographic subject distance out of the plurality of face detection candidate areas, according to the acquired photographic subject distance information, and proceeding in order of increasing photographic subject distance, wherein if the human face is detected, said executing step terminates the face detection process; and wherein at least said dividing and determining step and said executing step are performed by a processor.

* * * * *